(12) United States Patent
Sada et al.

(10) Patent No.: US 6,910,410 B2
(45) Date of Patent: Jun. 28, 2005

(54) METHOD AND APPARATUS FOR MANUFACTURING CHARCOAL GRILLED FOODS

(75) Inventors: Morihiro Sada, Kanagawa (JP); Teijirou Nakamura, Kanagawa (JP)

(73) Assignee: Ajinomoto Co., Inc., Tokyo (JP)

( * ) Notice: Subject to any disclaimer, the term of this patent is extended or adjusted under 35 U.S.C. 154(b) by 44 days.

(21) Appl. No.: 09/903,788

(22) Filed: Jul. 13, 2001

(65) Prior Publication Data

US 2002/0033100 A1 Mar. 21, 2002

(30) Foreign Application Priority Data

Jul. 14, 2000 (JP) ........................................ 2000-214810

(51) Int. Cl.$^7$ ................................................ A47J 37/04
(52) U.S. Cl. .................. 99/329 P; 99/333; 99/338; 99/345; 99/386; 99/443 C; 99/450; 99/475; 99/476; 99/477; 126/502; 126/506; 126/554; 126/242
(58) Field of Search ...................... 99/475, 328, 329 R, 99/329 D, 329 RT, 333, 338, 345, 386, 393, 443 C, 450, 476, 477; 126/502–504, 506, 554, 242

(56) References Cited

U.S. PATENT DOCUMENTS

| 505,175 | A | * | 9/1893 | Pfleiderer et al. |
| 1,632,176 | A | * | 6/1927 | Crain |
| 2,390,455 | A | * | 12/1945 | Nalbach ....................... 198/138 |
| 3,897,722 | A | * | 8/1975 | Harris .......................... 99/345 |
| 4,487,138 | A | * | 12/1984 | Grebe .......................... 110/269 |
| 5,176,124 | A | * | 1/1993 | Wrasse ...................... 126/25 R |
| 5,910,332 | A | * | 6/1999 | Fakieh ....................... 426/523 |

FOREIGN PATENT DOCUMENTS

WO WO95/03713 2/1995

* cited by examiner

Primary Examiner—Drew Becker
(74) Attorney, Agent, or Firm—Oblon, Spivak, McClelland, Maier & Neustadt, P.C.

(57) ABSTRACT

A method and apparatus for manufacturing charcoal grilled foods including a forge conveyer loading and transferring charcoals burning after firing, a temperature sensor detecting the heating power on the forge, a continuous type forge of a charcoal fire consisting of an air blower to keep heating power constant by means of adjusting air-capacity on the basis of the heating power detected by the temperature sensor, an ingredients transportation conveyer arranged over the forge and appropriately turning over the ingredients while transferring them.

11 Claims, 3 Drawing Sheets

Spitting Zone (Single Chain)

METHOD AND APPARATUS FOR MANUFACTURING CHARCOAL GRILLED FOODS

FIELD OF THE INVENTION

The present invention concerns method and apparatus for automatically grilling by charcoal fire those foods such as grilled chicken on skewers, roast giblets, a grilled chicken, a broiled eel, a grilled dumpling, a grilled rice ball, a grilled rice cake, a rice cracker, and so on by automatically supplying charcoals and keeping a constant burning condition.

BACKGROUND OF THE INVENTION

Those grilled foods like grilled chicken on skewers, roast giblets, a broiled eel, a grilled dumpling, a grilled rice ball, a grilled rice cake, and a rice cracker are the foods that have been selectively tasted from ancient times.

In the case where these grilled foods are grilled on the fire, grill cooking by a charcoal fire is considered to be the best, and the grilling by charcoal fire is superiorly used although there are many heating power sources such as electric power or gas that has constant heating power easily controlled.

The reasons why the grilling by charcoal fire is superior in comparison with electric heating or gas-burner, etc. are suitability of far-infrared ray generating from the charcoal fire to grill cooking for foods, no influence from the charcoal fire of steam or smelling ingredients usually found in case of gas-burner, and giving desirable grilling flavor to grilled foods by smudging component generating from the charcoal soon after firing.

However, grilling by charcoal fire includes the following shortcomings:

Because the heating power of the charcoal fire is not constant from firing to the completion of the grilling, it is necessary to supply appropriately new charcoal in order to continue burning for a long time.

In case of grilling by charcoal fire, it is necessary to regulate heating power using a fan or so while watching the heating power, and to continue the grill cooking while observing differences of states of grilling unevenness and grilling completion caused by the difference of heating power with visual observation.

In other words, in the case where an excellent grilled foods is cooked by means of the charcoal fire, a well experienced cook was required to regulate the heating power by supplying charcoals and using a fan or so, to continue turning operation or saucing operation of grilled foods with hand work while observing the grilled states, and to determine the grilling completion.

Therefore, the implementation of large-scale charcoal grilling apparatus with industry scale was difficult because employing forge is limited to the size within the reaching field of the cook's hands.

An object of the present invention is to provide control method and apparatus for charcoal fire useful for automatically controlling the heating power including the supply of charcoal, firing of charcoal, regulation of heating power, and disposal of the embers which finished burning and further, realizing grill cooking of grilled foods with usually constant heating power and to realize automatic cooking of grilled foods with the use of the charcoal fire in factory scale.

Other object of the invention is to establish the grill cooking method which is useful for production of factory scale, and for the manufacture of the charcoal grilled foods possible by the continuous operation without the need for manipulation by the hand work of a trained cooking craftsman.

SUMMARY OF THE INVENTION

The inventors of this invention zealously studied in order to solve the above-described problems.

As a result, the present invention was completed by finding that the uniform grill cooking is possible by transferring a charcoal fire spending the time from firing to burning termination by conveying the charcoal soon after firing on a moving conveyer, at the same time, regulating the volume of the wind sent from an air blower by detecting the heating power by means of a temperature sensor, regulating the heating power of the forge constantly as a whole, by controlling on demand the velocity of the conveyer that transfer the forge, and transferring the ingredients on the conveyer towards the upper part of the forge.

That is to say, the main invention is a manufacturing method of charcoal grilled foods characterized in grill cooking by charcoal fire transferring the ingredients including firing the charcoals spread over the conveyer made of heat-resistant material and having gas permeability, and, while transferring the forge with a variable velocity conveyer, transfers the ingredients on the special conveyer provided on the upper part of the forge.

This invention is the manufacturing method of charcoal grilled foods characterized in that keeping heating power of the charcoal fire constant by means of a temperature sensor and an air blower capable of controlling the blast quantity to the forge where the charcoal fire after firing is transferred on a conveyer, and in controlling the blast quantity from the air blower and the transferring velocity of the conveyer by the detecting result of the heating power obtained from the temperature sensor.

Furthermore, this invention is characterized in that packaging the charcoals piled up beforehand, that will be spread on the conveyer to compose the forge, by combustible packaging material and in supplying the packaged charcoals on to the conveyer appropriately.

Furthermore, in addition, this invention is characterized in that charcoal grill cooking the foods sequentially turning over one after another among the transferring stage of the foods over the forge by the use of ingredients transportation conveyer.

This invention is also characterized in that applying sauce onto the foods among the transferring stage of the foods over the forge by the use of the ingredients transportation conveyer.

Manufacturing apparatus of charcoal grilled foods of the present invention includes the forge conveyer that horizontally transfers the forge designed to fire the piled charcoals at the leading end and to exhaust the charcoals which has finished burning at the trailing end, a temperature sensor detecting heating power of forge provided between both ends, an air blower controlling the blowing volume depending on the heating power detected by the temperature sensor, and the ingredients transportation conveyer that transfers ingredients horizontally over the forge.

DESCRIPTION OF THE PREFERRED EMBODIMENTS

Figure 1:
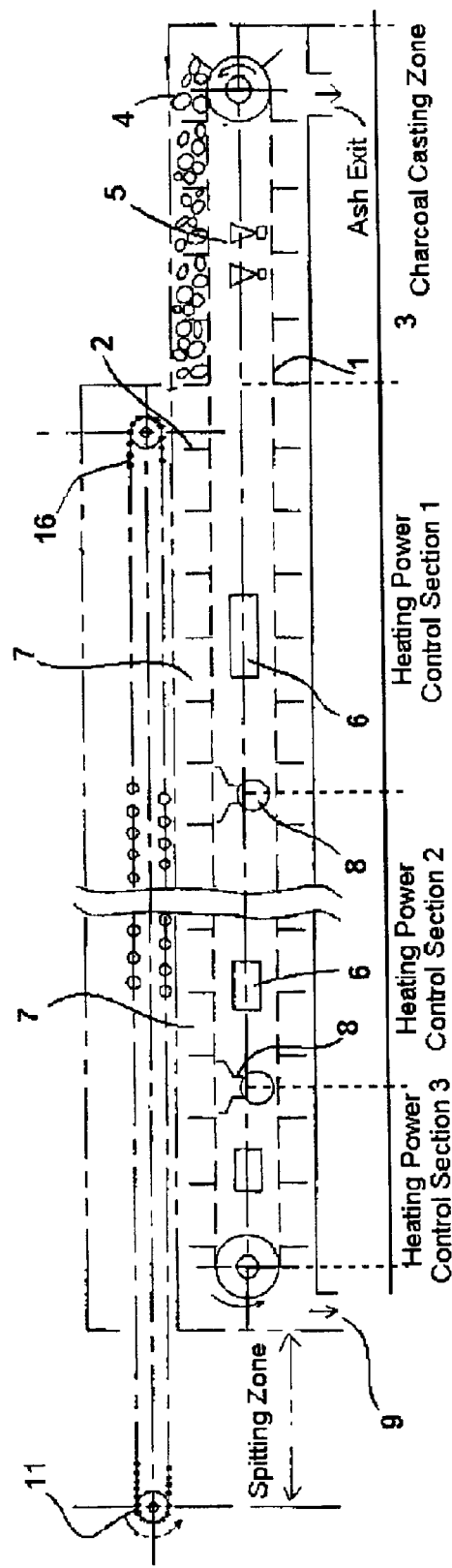
FIG. 1 is a front elevation view showing an example of manufacturing apparatus of charcoal grilled foods by the present invention.

In this invention, charcoal grilled foods defines such a food with ingredients that is grill cooked by direct charcoal fire as a grilled chicken on skewers, roast giblets, a grilled chicken, a broiled eel, a grilled dumpling, a grilled rice ball, a grilled rice cake, rice cracker, etc.

Although most of them are occupied by grilled foods with the spit being represented by a grilled chicken on skewers or a broiled eel, etc., the grill cooking foods of the present invention include the foods grill cooked over a forge using a grill or other holding means without necessary requirement of spitting.

A forge conveyer composing the present invention needs to have fire resistance against charcoal fire and gas permeability of the air required for combustion along with retention nature of the charcoal fire loaded on the conveyer.

As the forge conveyer, a net conveyer using heat-resistant material such as, for example, metal, fire proof brick, ceramics, etc., or a bar conveyer using bars consisting of these materials or so can be applied.

Regarding the forge conveyer, the transfer velocity is determined to move from the leading end to the trailing end by spending the time from the firing of the charcoal fire to the termination of the combustion. However, the transfer velocity may be changed appropriately depending on the necessity.

The charcoals are piled up uniformly in two steps or three steps at the leading end of the forge conveyer. Piling up the charcoals may be by the method of piling up scattered charcoals manually by means of worker's hand, or may be the method of setting packed charcoals in a package on the forge conveyer, after previously providing the packed charcoals packaging in a predetermined size the charcoals that were piled up in the shape of burning with packaging materials of combustibility using paper, etc.

The charcoals loaded on the forge conveyer are fired with an auxiliary gas burner for firing and generate heating power possible for grill cooking before reaching to the grilling zone. The grilling zone may be divided into several zones. In each zone, the heating power of the charcoal fire of the zone is detected by means of the temperature sensor provided nearby the ingredients.

Under the forge conveyer, the air blower controllable of air-capacity is installed, and regulating the air supply quantity of the air blower in such a way that the heating power sensed by means of temperature sensor maintains constant value controls the heating power of each zone. Accordingly, the heating power from the leading end to the trailing end of the forge conveyer is able to be kept constant every time in each zone, thereby enable to give a total constant grill effect for ingredients passing on the ingredients transportation conveyer.

In addition, an ashtray zone may be provided in the middle of the forge conveyer. In the ashtray zone, ashes attaching to the charcoals after burning can be sputtered either by giving oscillation or impact of percussion against the forge conveyer, and/or by the method of suction removal of the dropped ashes by means of an aspiration air blower.

It is preferable that the forge conveyer is transferred spending the time necessary for almost all the charcoals burning out between the leading end and the trailing end. In the case where the heating power does not increase even when the quantity of blast by the air blower is increased by the reason that the burning out of the charcoals is early, it is suitable that the feeding quantity of the charcoals is increased by accelerating the velocity of the forge conveyer under the decision that the charcoals burnt out.

An ingredients transportation conveyer is installed for transferring the ingredients holding on it over the forge conveyer of high temperature with burning charcoals. As the holding method for the ingredients of the ingredients transportation conveyer, any method matched for the shape of the ingredients can be applied.

In other words, regarding the ingredients with spits such as a grilled chicken on skewers or a broiled eel, catching the spits at these one end or both ends can hold them. In addition, regarding the ingredients without any spitting such as a grilled rice ball, a grilled rice cake or so, a conveyer with the use of a grid may be applied and these ingredients can be transferred on the grid.

In grilling by charcoal fire, the ingredients must be grilled on both surfaces by turning them over in the middle of grilling because the heating power source exists in the lower part of them. Regarding the method of turning over the ingredients, the method matching with the shape of the ingredients with or without the spit, in the case of the ingredients with spitting, there are methods of turning over the ingredients by means of spinning holder of the spit in the middle of the transferring, or the method of making ingredients turn over by reciprocating the transportation conveyer. In addition, in the case of grilling with the use of a grid, the ingredients can be turned over in the state of being caught between two pieces of the grids by the use of the transportation conveyer with the grids.

Many of charcoal grilled foods are grilled attaching tastes by applying sauce on the surface of them in the middle of the grill cooking. Regarding the applying method of the sauce, it is not particularly limited to a special method, and for example, the method of applying the sauce to the ingredients by leading the transportation conveyer with ingredients into a container of sauce, the method of applying the sauce to the ingredients by dripping the sauce, and the method of applying the sauce to the ingredients using a paint brush or a brush can be adopted.

In this invention, using the charcoals having the variation of heating power from combustion initiation to combustion termination, continually transporting the charcoals after firing, and at the same time, regulating the heating power average in total, and the grill cooking with constant heating power can be realized against the ingredients transferred on the ingredients transportation conveyer moving over the forge containing the charcoals. By using this method, there comes the advantage of realizing the automatic manufacture in factory scale of the charcoal grilled foods that conventionally required handwork of the cooking expert.

The kind of the charcoal used as the fuel of this invention is not particularly specified. It may be a hard charcoal or a black charcoal without any distinction.

In this invention, being characterized in continually feeding the charcoals, the constant heating power can be always supplied by means of both the feeding mechanism and the heating power controlling mechanism. Therefore, the charcoal employed as the fuel may be popularly cheap black charcoal instead of so-called high-quality Bincho charcoal that is expensive in unit price.

EXAMPLES

In the following examples are described several preferred embodiments to concretely illustrate the invention, however, it is to be understood that the invention is not intended to be limited to the specific embodiments.

Example 1

An example of manufacturing apparatus of charcoal grilled foods by the present invention will be explained with reference to FIGS. 1 to 4.

FIG. 1 shows front elevation view of manufacturing apparatus of the grilled chicken on skewers. In FIG. 1, the forge conveyer consisting of a mesh conveyer with attachment is designated by the numeral 1.

The forge conveyer is a conveyer having gas permeability and the flexibility composed in mesh stile using metallic material, and dashboard attachment 2 is installed with constant space. At charcoal casting zone 3 near the leading end of the forge conveyer, a fixed amount of charcoals 4 are cast manually into the space partitioned by the attachment.

Firing burner 5 in a firing zone fires the charcoals cast on the forge conveyer, and the fire derrick up is done to get enough heating power spending the transit time over the section to a grilling zone. The charcoals having the enough heating power after fire derrick up is over are transferred to the grilling zone, and supplied as heat source for the grill cooking.

In the grilling zone, combustion air is fed from air inlet 6 provided underneath of the forge conveyer, and in the present embodiment, dividing the grilling zone into three heating power control sections, the air feeding mechanism for every heating power control section from each different system was adopted.

In addition, temperature sensor 7 was installed in each section of the grilling zone, and by measuring the heating power of the heating power control section in the combustion zone by means of intensity of heat of radiation detected by the temperature sensor, the air feeding quantity was controlled in order to keep the heating power constant.

Moreover, in consideration of the case where the heating power did not rise enough in spite of increasing the quantity of air feed, the mechanism to temporarily speed up the transfer velocity of the forge conveyer, deciding that charcoals burnt out, was built in.

Between the three heating power control sections provided in the combustion zone, ashtray zones were arranged. In the ashtray zone, along with beating the bottom surface of the forge conveyer by activating mallet from the lower part of the conveyer, aspiring the air from upward of the forge, through the forge toward underneath the forge by arranging ashtray suction inlet 8, the ashes sputtered to burning charcoals were designed to be removed.

At the end of the grilling zone, because remainder charcoals drop caused by turning over of the forge conveyer with sprocket, the dropped remainder charcoals were designed to be exhausted outside the system from remainder charcoal outlet 9. The forge conveyer was designed to have two lines of conveyers in parallel (line space: 5 cm) and one forge.

Figure 2:
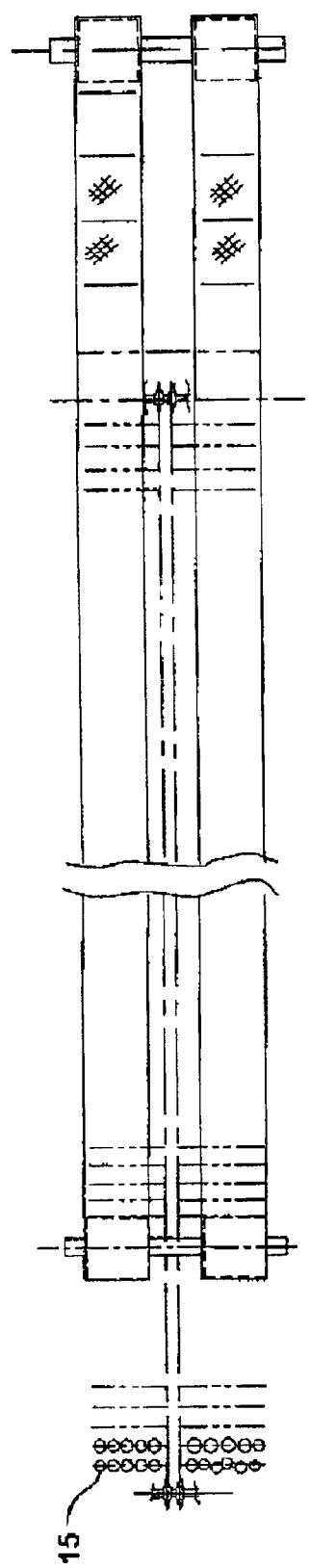
FIG. 2 is an elevation showing an example of a transportation conveyer for conveying chicken ingredients of spit roasting.

FIG. 2 is an elevation showing a transportation conveyer for conveying chicken ingredients of spit roasting. As shown in FIG. 2, transportation conveyer 10 for conveying the grilling ingredients was installed in location of central part of the forge conveyers arranged in two lines (between the lines) and 20 cm upward. The transportation conveyer consists of double sprocket type chain and the mechanism was designed to be reciprocally driven between a pair of double pattern sprocket 11 provided at both ends of the conveyer.

Figure 3:
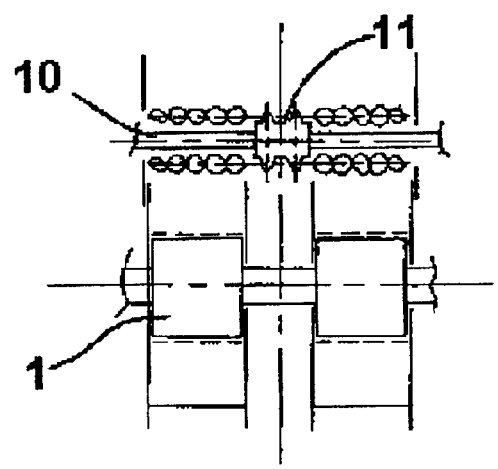
FIG. 3 is a side elevation view showing an example of manufacturing apparatus of charcoal grilled foods by the present invention.
Figure 4:
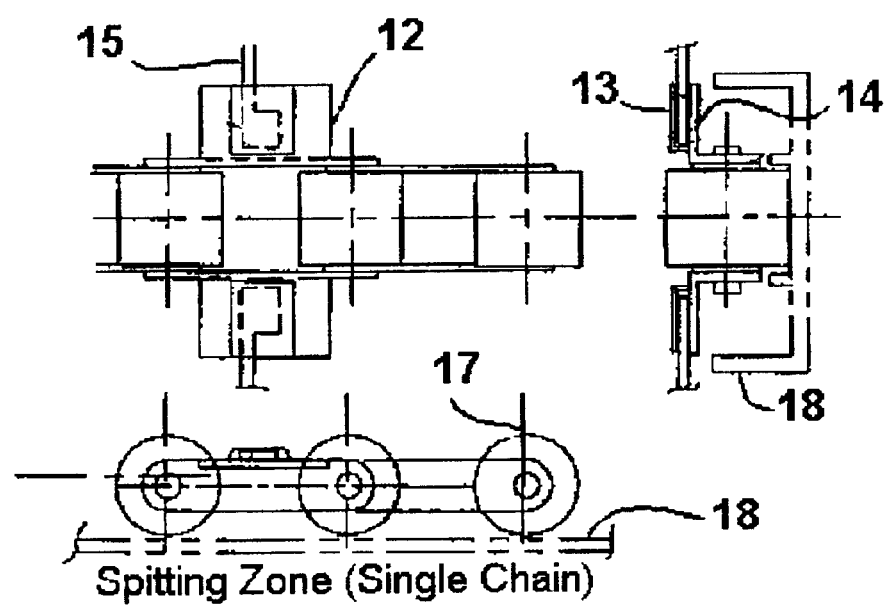
FIG. 4 is a block diagram showing spitting section.

Attachment 12 with spit cradle 14 and tap metal 13 was installed to the roller axis of the transportation conveyer chain. FIG. 3 is a side elevation view showing manufacturing apparatus for spit-roasting chicken, and FIG. 4 is block diagram showing spit installation part. Tap metal 13 assembled in the attachment was devised to have the structure of pushing the spit cradle 14 by means of spring mechanism, and in addition, to have a clipping mechanism which hold spit 15 sandwiching among itself (see FIG. 3 and FIG. 4).

The transportation conveyer extends further 2 m over the remainder charcoal outlet through the grilling zone of the forge conveyer, and the extended division was designed to be a spitting zone.

As the grilling ingredients, chicken spitting after soaked in the sauce beforehand was provided, and it is held by the root of the spit being clipped between the spit cradle and the tap metals installed in attachment under the transportation conveyer, in the spitting zone and by manual operation. The spitted chicken held by the spit cradle and the tap metal of the attachment was conveyed from the remainder charcoal outlet side of the forge conveyer towards charcoal casting zone side, and the lower surface of the spitted chicken was cooked while being transferred over the forge conveyer.

The spitted chicken was turned over at the inlet of the grilling zone on the forge conveyer by the sprocket of the transportation conveyer. A curtain flow mechanism 16 of the sauce from upside was installed in the location of turning over the spit, and by passing through the curtain flow of the sauce, the spitted chicken was applied the sauce. The spitted chicken with the sauce applied in the middle of being grilled would return to the spitting zone through the upper part of the transportation conveyer, and the opposite surface of the spitted chicken was grill cooked in this step.

The spitted chicken after the grill cooking which left from the upper part of the forge conveyer was removed apart from the attachment of the transportation conveyer manually at the spitting zone and finished as a product.

By using continuous charcoal grill cooking apparatus of this invention, the state of little fluctuation of the heating power was kept for a long time in each part of the forge, and by letting the spitted chicken pass over the forge spending the fixed time by means of the transportation conveyer for transferring the grilling ingredients, the grilled chicken on skewers with constant grill finishing in both front and back surface of the spitted chickens were produced.

Example 2

A bar chain conveyer driven by a chain fixed at both ends of ceramics bar with diameter of 1 cm was used as the forge conveyer.

Sakura charcoal was used as the fuel and it was cut in size of around 12 cm beforehand, piled up the pieces into three steps in length and breadth and, packaged with paper to make a rectangular solid of 12 cm wide, 20 cm long, and 8 cm thickness in contour. The charcoal packed in the rectangular solid configuration was piled up in thickness direction at the charcoal casting zone of the forge conveyer, and a supplying mechanism of the fuel feeding it one by one sequentially to the forge conveyer after scraping it out with a picking nail installed in the chain of the forge conveyer was adopted. The charcoal parcel automatically supplied by the forge conveyer was fired in the state of the paper package with burner arranged under the firing zone.

In the present embodiment, dividing the grilling zone into two heating power control section, the air feeding mechanism for every heating power control section from each different system is adopted. In addition, temperature sensor is installed in each section of a grilling zone, and by measuring the heating power of the heating power control section in the combustion zone by means of intensity of heat of radiation detected by the temperature sensor, the air feeding quantity was controlled in order to keep the heating power constant. Between the heating power control sections, the ashtray mechanism same as Example 1 was arranged.

One line of the forge conveyer was used and the transportation conveyer carrying the grilling ingredients was installed over the forge conveyer. As the transportation conveyer, two net conveyers comprising the net meshed with stainless steel wire of 2 mm in diameter, placing them one upon another over the ashtray mechanism of the forge conveyer, and a turn over mechanism in the timing of transferring the grilling ingredients from the transportation conveyer of the upper section to the transportation conveyer of the lower section was adopted.

Using the continuous charcoal grill cooking apparatus, fillets of salted salmon were carried on the transportation conveyer, roast salt salmons of good grilling completion were usually obtained spending the grilling time of eight minutes.

As said force hereinabove, the present invention provides automatic heating power control of charcoals including supply of the charcoals, firing of the charcoals, control of the heating power, and the disposals of embers which finished burning, and provides an useful heating power control method and apparatus for grill cooking of grilled foods with always constant heating power, and accordingly, realizes automatic cooking of grilled foods with the use of the charcoal fire in factory scale.

It is further understood by those skilled in the art that the foregoing description is a preferred embodiment of the invention and that various changes and modifications may be made in the invention without departing from the spirit and scope thereof.

What is claimed is:

1. A forge for preparing charcoal grilled foods having a leading edge, a trailing edge, and at least a first and a second heating section between said leading and trailing edges, said forge comprising:

a forge conveyer, provided with means to control a transferring velocity of the forge conveyer, said forge conveyer being configured to horizontally transfer a pile of burning charcoals from a leading end of the forge conveyer to an exhaust outlet for the burned charcoals at a trailing end thereof, said forge conveyer being made of a heat-resistant material and having gas permeability;

at least a first and a second temperature sensor located in said at least first and second heating sections, respectively, and configured to detect the heating power inside each of said at least first and second heating sections of the forge;

at least a first variable output air blower for supplying combustion air to the pile of burning charcoals in said at least first and second heating sections on the basis of the detected heating power inside each of said at least first and second heating sections of the forge; and a transportation conveyer configured to hold and transport a plurality of foods being grilled by the burning charcoals.

2. A forge for preparing charcoal grilled foods as claimed in claim 1, wherein said forge conveyer is a mesh conveyer.

3. A forge for preparing charcoal grilled foods as claimed in claim 2, wherein said transportation conveyer is a chain conveyer.

4. A forge for preparing charcoal grilled foods as claimed in claim 2, wherein said forge conveyer is a chain conveyer.

5. A forge for preparing charcoal grilled foods as claimed in claim 4, wherein said transportation conveyer is a net conveyer.

6. A forge for preparing charcoal grilled foods as claimed in claim 1, further comprising a means for applying sauce.

7. A forge for preparing charcoal grilled foods as claimed in claim 1, wherein the heating power inside each of said at least first and second heating sections of the forge is regulated constantly.

8. A forge for preparing charcoal grilled foods as claimed in claim 1, wherein said transferring velocity of said forge conveyer is changed on the basis of said detected heating power.

9. A forge for preparing charcoal grilled foods as claimed in claim 1, further comprising at least a first and a second ashtray suction inlet disposed substantially near said forge conveyer in each of said at least first and second heating sections, respectively, said at least first and second ashtray suction inlets being configured to remove ash from said forge conveyer.

10. A forge for preparing charcoal grilled foods as claimed in claim 9, further comprising at least a first and a second shaker near each of said at least first and second ashtray suction inlets, said at least first and second shakers being configured to shake said forge conveyer for the purpose of removing ash.

11. A forge for preparing charcoal grilled foods as claimed in claim 1, wherein said at least first and second temperature sensors are heat flux sensors.

* * * * *